Patented Jan. 31, 1928.

1,657,893

UNITED STATES PATENT OFFICE.

WILLIAM O. NANCE, OF TULSA, OKLAHOMA, ASSIGNOR TO DELETE COMPANY, INC., OF TULSA, OKLAHOMA.

CLEANSING COMPOUND AND PROCESS FOR MAKING SAME.

No Drawing.   Application filed November 9, 1927.   Serial No. 232,200.

The present application is a continuation, in part, of my co-pending application upon cleansing compound and process for making same, Serial Number 135,289, filed September 13, 1926.

This invention relates to a substantially non-aqueous cleansing compound in which volatile solvents are cohered in an emulsion of soap with mineral oil, and has special reference to a cleansing compound for use in the dry cleaning of fabrics and the like, the compound being adapted to be dissolved in gasoline or other solvent dry cleaning fluids.

The object sought and realized by this invention is the production of a cleansing compound which is readily soluble, without heating, in gasoline and other fluids or combinations of fluids used in dry cleaning, and which will remove spots and stains arising from perspiration, sweet spots, blood, water stains, gum, tar, paints, greases and other foreign substances, either without or with a minimum amount of brushing, spotting or scrubbing of the fabric articles.

In the present invention, I heat and agitate a mixture of mineral oil and fatty acid, the latter in a quantity sufficient that when saponified and cooled it will form a homogeneous emulsion consisting of a soap cohered and emulsified with the mineral oil, sufficient caustic alkaline solution being used to saponify the fatty acid, and the temperature of the mixture being maintained above the boiling point of water sufficiently long to make it substantially free from water and permit the coherence, emulsification and saponification to be nearly completed.

Before adding the volatile solvents, the temperature of the mixture is lowered enough to minimize the loss of such solvents from vaporization, although such temperature is maintained sufficiently high to keep the mixture in liquid form and permit the cohesion, emulsification and saponification to become substantially complete, after the solvents are added. The mixture is agitated during a large portion of the time that it is cooling, but the agitation is discontinued before the mixture has become so cool that further agitation will have a tendency to break up or retard the cohesion and emulsification and prevent the natural result of this process, which is the formation of a substantially stable cohesion and emulsion of the whole in the form of a paste, butter or semisolid.

I have determined that if it is desired that the compound be more in the form of a liquid than of a butter or semisolid, this result may be accomplished by using a fatty acid, such as oleic acid, which has little tendency to solidify in the foregoing process, or by continuing the agitation until the compound has cooled to normal or room temperature.

In a specific embodiment of the present invention, I have taken about 60 parts by weight of a good quality, light colored, clean, refined mineral oil substantially free from paraffin and having a flash point and initial boiling point of approximately 260 degrees centigrade, and 15 parts by weight of stearic acid, and heated them in a jacketed kettle to a temperature varying from 125 to 140 degrees centigrade, then slowly added a solution consisting of about 7 parts of potassium hydroxide and about 3 parts of water, continually agitating the mixture and maintaining the above high temperature for from 15 to 30 minutes until the accumulated foam resulting from saponification has partially subsided. The mixture was then run into a mixer and permitted to cool to about 75 degrees centigrade, and then I slowly added to it a mixture consisting of about 2½ parts each of the following solvents: Acetone, carbon tetrachloride, chloroform, ethyl acetate, amyl alcohol, and denatured alcohol. The compound was agitated continuously in the mixer for about 3 hours until it had cooled to a temperature of approximately 50 degrees centigrade, after which it was run into containers and permitted, without further agitation, to cool to normal room temperature.

The result was a substantially neutral, homogeneous butter or semi-solid mass, readily soluble, within a few seconds and without the aid of heat, in gasoline and other solvent dry cleaning fluids and their combinations, and also in either hot or cold water.

I have determined that the fatty acid used may be any fat or oil containing stearic acid, oleic or palmitic acids, or any saponifiable fat or oil; that the caustic alkali used may be potassium, sodium or ammonium hydroxides, or potassium, sodium, or ammonium carbonates; and that the solvents may be varied and the solvents named be used in unequal quantities, or other solvents having detergent properties may be added to them or substituted for them. Among a large number of solvents which I have added or substituted, I mention toluol, xylol, ether, benzol, benzine, carbon disulphide, pyridine, aniline oil, amyl acetate, butanol, creosol, turpentine, methyl alcohol and ethyl alcohol. When a fatty acid other than stearic acid is used, or a caustic alkali other than potassium hydroxide is used, I vary the proportions in accordance with the saponification value of the fat or oil and the grade of the caustic alkali. I find that the proper proportions will also vary if the ingredients used are not of standard quality and strength or if they contain impurities.

In varying the solvents or the proportions used or mixing them in different combinations, I have found that it is necessary to be mindful of the detergent values of the solvents and the effect that they will have on fabrics and colors. I determine the quality and strength of the fatty acid and caustic alkali by laboratory tests, after which I use the approximate saponifiable equivalent to the quantity of stearic acid set out in the foregoing example to secure a final emulsion of the desired perfection and stability. I have found that more fatty acid is preferable if the mineral oil is of relatively lower emulsifying power. I use such amount of caustic alkali as is required to neutralize the fatty acid in accordance with the laboratory findings.

If the foregoing suggested substitutes or additions are properly made, the resulting compound may vary in physical properties, but not in those superior qualities and properties characteristic of this invention, which are as follows:—

(a) A cleansing compound which is substantially free from moisture, readily soluble in gasoline and other fluids used in dry cleaning, causing no shrinkage of garments or injury to colors susceptible to injury from moisture.

(b) A cleaning compound containing a large amount of mineral oil which facilitates and quickens the solubility of the compound in gasoline and other fluids used in dry cleaning, and constitutes an excellent carrier of volatile solvents, and absorbent of oils, greases, dirt and foreign matter of various kinds sought to be removed from the garments, and which possesses high detergent properties, and tends to revive the sheen or luster of the garments cleaned, and adds greatly to that characteristic of the finished product which is, that it will rinse freely and completely out of the fabrics after it has served its purpose.

(c) A substantially stable homogeneous emulsion in which cohere highly volatile solvents possessing valuable detergent qualities, although substantially all moisture has been eliminated by superheating, the solvent ingredients being selected to give a detergent mixture effective to facilitate the removal of as many kinds of spots, stains and foreign substances from fabrics as is practical without injuriously effecting the fabrics or colors, or retaining odors which are offensive and difficult to remove from the garments.

(d) A substantially neutral cleansing compound in which the saponification and emulsification are sufficiently perfect that none of the ingredients remain on the fabric after rinsing, or combine with objectionable foreign matter after being dissolved in the gasoline or other fluid used for dry cleaning.

(e) A cleansing compound which, although readily soluble in gasoline and other fluids used in dry cleaning, is almost equally as readily soluble in cold or hot water.

(f) A cleansing compound valuable for general use wherever soaps are used.

(g) A dry cleaning compound which not only facilitates the action and adds to the cleansing properties of the gasoline and other fluids used in dry cleaning, but after it has served its purpose as a cleanser of fabrics, operates to settle, clear and clean of impurities, the gasoline and other fluids used in dry cleaning.

What I claim as new is:—

1. The process of producing a substantially stable non-aqueous detergent paste readily soluble in dry cleaning liquids which comprises gradually adding a solution of substantially 7 parts of a caustic alkali and 3 parts of water to a solution of substantially 60 parts of a good quality and light colored clean mineral oil and 15 parts of fatty acid while the latter solution is agitated and heated to a temperature above the boiling point of water so that the fatty acid is emulsified with the mineral oil during the partial saponification of the fatty acid, then adding substantially 15 parts of a mixture of stain and spot removing volatile solvents differing in cleansing properties while the temperature is reduced but sufficiently high to substantially complete the saponification of the fatty acid and emulsify the solvents with the mineral oil and then allowing the mass to cool.

2. The process of producing a substantially stable non-aqueous detergent paste readily soluble in dry cleaning liquids which comprises heating a mixture of substantially 60 parts of a good quality and light colored mineral oil and 15 parts of stearic acid to at least 125 degrees centigrade, adding gradually to this mixture a solution of 7 parts of potassium hydroxide and 3 parts of water, boiling the entire mixture until the potassium hydroxide has nearly entirely combined with the stearic acid, then lowering the temperature of the mass to substantially 50 degrees centigrade, then adding to the mass substantially 15 parts of a mixture of substantially equal parts of stain and spot removing volatile solvents differing in cleansing properties and then allowing the mass to cool.

3. A cleaning compound readily soluble in gasoline and other solvent dry cleaning liquids, and comprising a substantially non-aqueous stable paste containing substantially 60 parts of a good quality and light colored clean mineral oil, and 15 parts of a mixture of substantially equal parts of stain and spot removing volatile solvents of differing cleaning properties and substantially 25 parts of saponified fatty acid, emulsified with the mineral oil.

In testimony whereof I affix my signature.

WILLIAM O. NANCE.